March 7, 1950     A. P. FOX     2,499,909
REEL
Filed Sept. 29, 1947     4 Sheets-Sheet 1
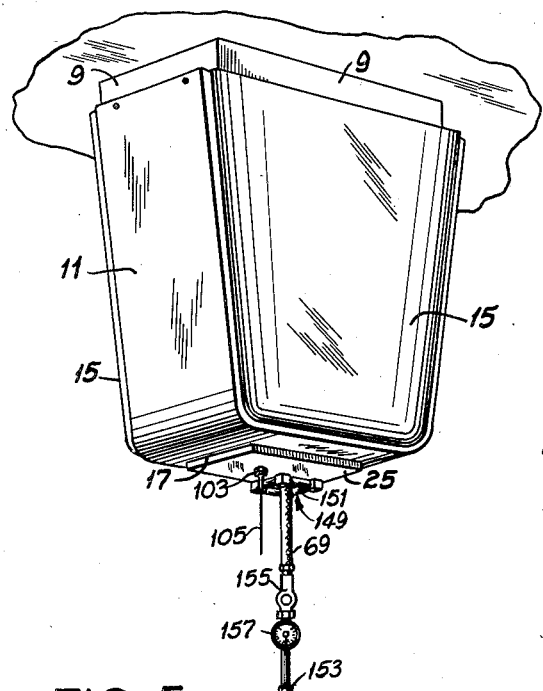
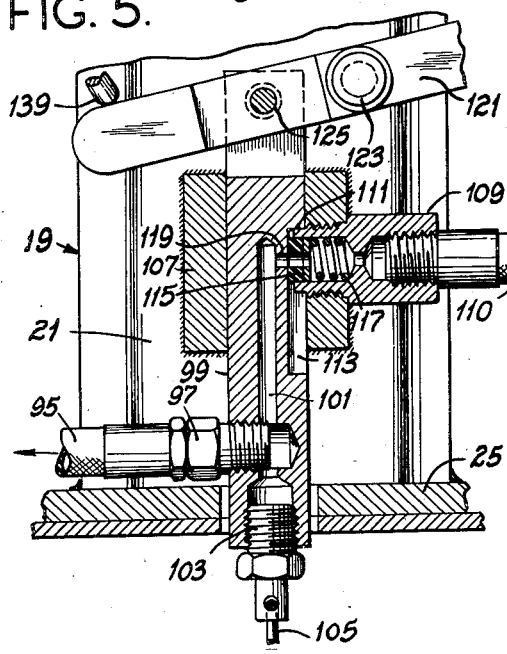
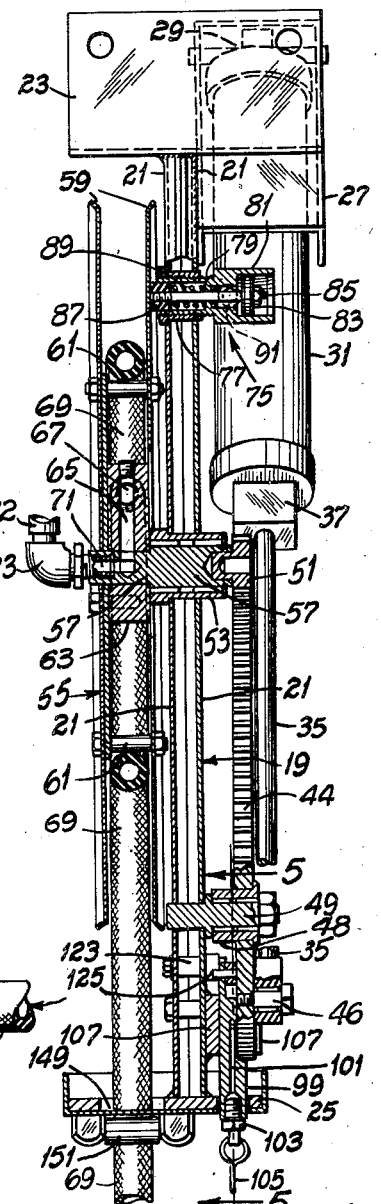

March 7, 1950 A. P. FOX 2,499,909
REEL
Filed Sept. 29, 1947 4 Sheets-Sheet 2

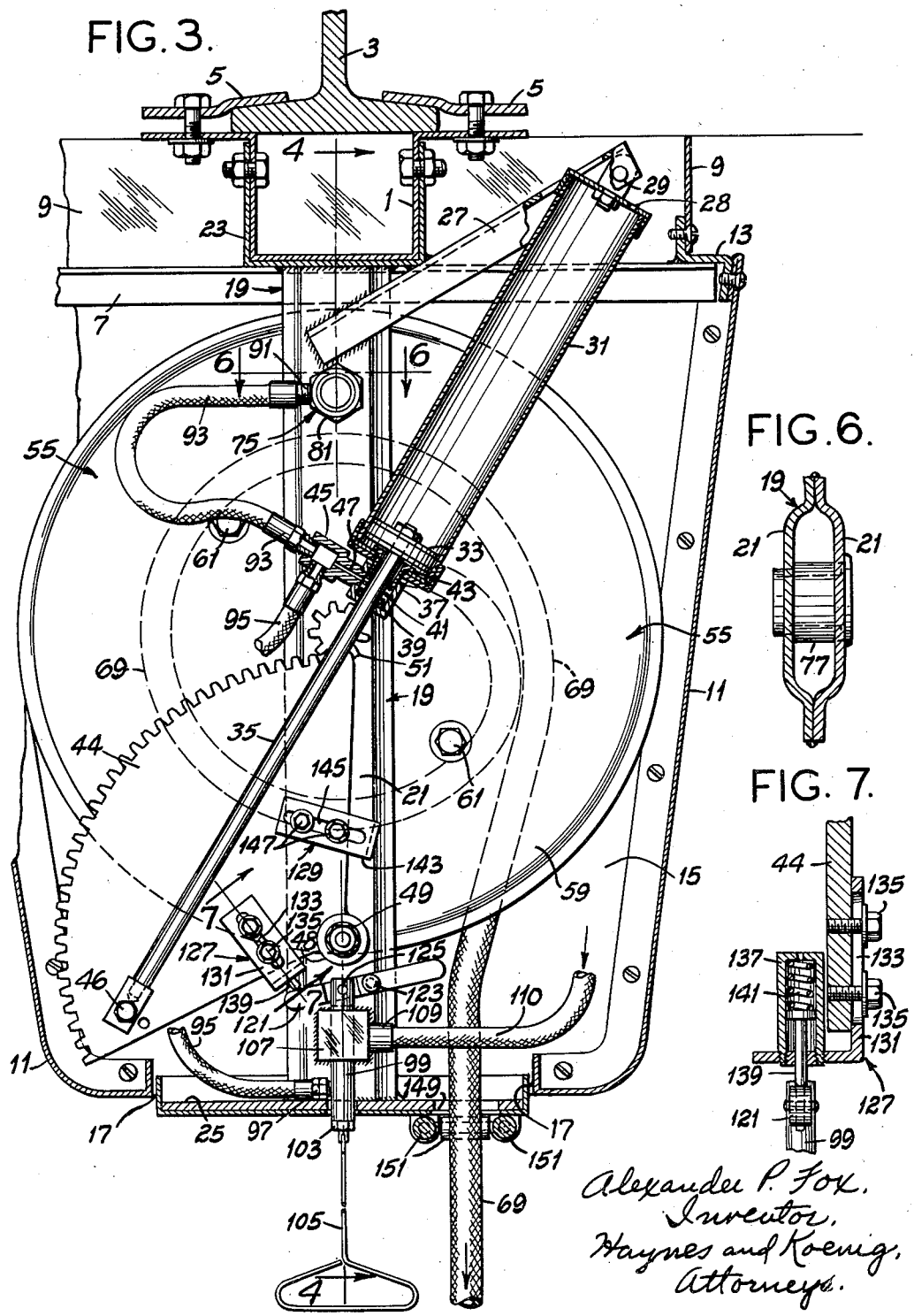

March 7, 1950 A. P. FOX 2,499,909
REEL

Filed Sept. 29, 1947 4 Sheets-Sheet 4

Alexander P. Fox,
Inventor,
Haynes and Koenig,
Attorneys.

Patented Mar. 7, 1950

2,499,909

UNITED STATES PATENT OFFICE 2,499,909

REEL

Alexander P. Fox, University City, Mo., assignor to Lincoln Engineering Company, St. Louis, Mo., a corporation of Missouri Application September 29, 1947, Serial No. 776,819

4 Claims. (Cl. 242—86)

This invention relates to reels for retrieving hose, cable and similar lines which are common in and about filling stations and the like.

The invention is an improvement upon the constructions shown in Barks et al. 2,279,156, dated April 7, 1942, for Reel.

Among the several objects of the invention may be noted the provision of a retrieving reel constructed for convenient mounting upon a variety of surfaces such as ceilings, walls, floors and the like; the provision of a reel of the class described which is simple, compact and rigid in construction; and the provision of a reel of this class which may be smoothly and rapidly operated under full control to withdraw and retrieve lines carrying high-pressure fluids. Other objects will be in part obvious and in part pointed out hereinafter.

The invention accordingly comprises the elements and combinations of elements, features of construction, and arrangement of parts which will be exemplified in the structures hereinafter described, and the scope of the application of which will be indicated in the following claims.

In the accompanying drawings, in which is illustrated one of various possible embodiments of the invention, Fig. 1 is an isometric view of the invention as mounted upon a ceiling;

Fig. 3 is a further enlarged vertical section of a complete assembly of the exploded parts of Fig. 2;

Fig. 4 is a fragmentary vertical section taken on line 4—4 of Fig. 3, parts being shown in elevation;

Fig. 5 is an enlarged detail section of a control valve, being taken on line 5—5 of Fig. 4;

Fig. 6 is a fragmentary detail section taken on line 6—6 of Fig. 3;

Fig. 7 is a detail section taken on line 7—7 of Fig. 3; and,

Similar reference characters indicate corresponding parts throughout the several views of the drawings.

Figure 2:
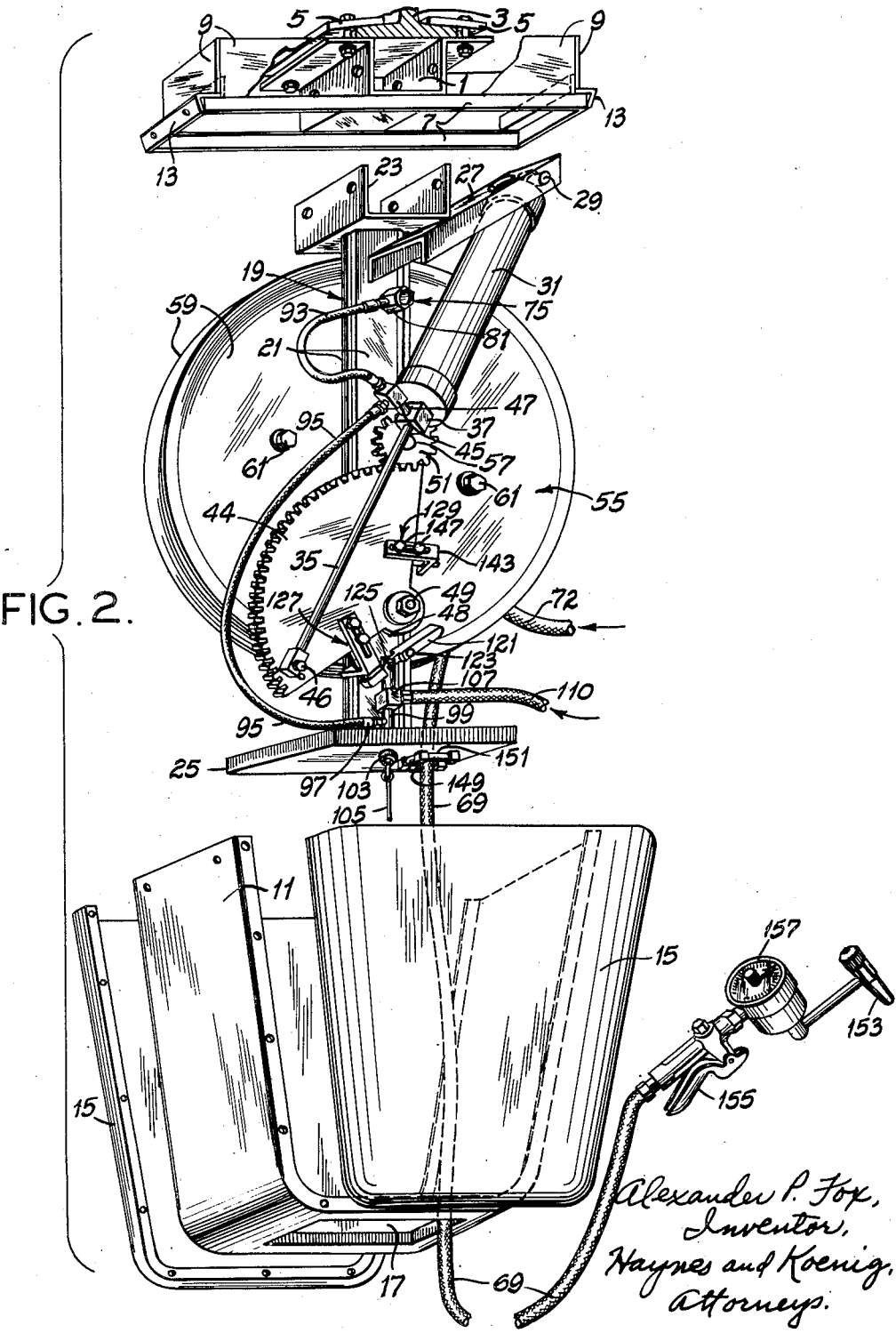
Fig. 2 is an exploded isometric view of the invention on a larger scale.

In the following description the reel will be described as being fastened to a ceiling but it may be fastened to a wall or the floor. Its form lends itself particularly to wall and ceiling mounting. Although the invention is described in connection with a hose for carrying lubricant under pressure, it is also useful for hoses carrying other material such as air or water. It is also useful for carrying lines other than hose, such for example as an electric line or the like.

Referring to the drawings, numeral 1 indicates a short length of steel channel which is held to an overhead supporting beam 3 by means of clamps 5. Lag screws or other fastening means may be substituted for the fastening means 5 where conditions permit.

Fastened to the bottom of the channel 1 is a rigid rectangular frame 7. Between this frame 7 and the ceiling or wall are trim plates 9. The above parts constitute a base. The purpose of the frame 7 is independently to carry the cover parts which are shown in exploded position at the bottom of Fig. 2. These cover parts consist of a flanged central U-shaped stamping 11 which is fastened to angle parts 13 at the ends of the frame 7. End covers 15 are fastened to the flanged sides of the U-shaped member 11, thus completing a cover for the operating parts to be described, said cover being supported independently of said operating parts. The covers 15 are preferably fastened to member 11 before the latter is fastened to the frame 7. The cover pieces 11, 15 and a platen 25 to be described are decoratively finished for a neat appearance. In the bottom of the U-shaped member 11 is a rectangular opening 17 to accommodate the platen 25, as will appear.

The operating parts of the reel are carried upon a flattened cantilever bracket or post 19. This post is preferably formed of two stampings 21 spot welded at their edges and in turn being both welded to a U-shaped channel support 23. The latter is telescoped within the channel 1 and is fastened thereto. At the outer end of the post is carried the platen 25 which with some clearance fits within the opening 17. Thus any limited shake that may occur in the post 19 during operation will not be transmitted to the cover pieces 11 and 15 which are independently carried upon the frame 7. This eliminates or minimizes rattling of the trimming cover parts.

Welded to the post 19 and one edge of the channel 23 is an arm 27. At the outer end of this arm 27 is a pivot 29 for supporting an air cylinder 31.

The cylinder 31 carries a piston 33 on a piston rod 35, the latter passing through an inlet gland 37. In the gland 37 is a packing 39 held to its seat by means of a spring 41, the latter reacting against a guide bushing 43. Attached to the inlet gland 37 is an inlet fitting 45 in which is a restricted inlet passage 47. Air introduced from the fitting 45 into the gland 37 may find its way into the cylinder 31 beneath the piston 33 because there is no packing between the rod 35 and the bushing 43, these two parts having a loose enough fit between them to admit the air. Obviously, if a closer fit is desired between the members 35 and 43, suitable passages may be machined through the member 43 for air admission purposes. The upper end of cylinder 31 is provided with an air relief hole 28 (Fig. 3).

The lower end of the piston rod 35 by means of pivot pin 46 is pivoted to a sector gear 44. This sector gear is supported upon the post 19 at stud 48 and needle bearing 49. The teeth of the sector gear 44 mesh with the teeth of a pinion gear 51 which is supported upon a needle bearing 53, also on the post 19. A stud 57, to which is fastened the gear 51, passes through the post and carries an attached reel shown generally at numeral 55. The reel comprises two spaced plates 59 supported by spacing pillars 61 and upon a central hub 63 (Fig. 4). This hub includes suitable passages 65, the outlet 67 of which connects with the hose 69 which is wound upon the reel. An inlet nipple 71 for the hub 63 has a packed rotary connection with an angle fitting 73 through which lubricant, air, water or the like is supplied through the hub 63 to the hose on the reel 55. The supply hose for this purpose is shown at 72.

At numeral 75 is shown a brake mechanism for the reel 55 (Figs. 2, 3 and 4). This comprises a bushing 77 passing through the post 19 into which is threaded the nose 79 of an air cylinder 81. This cylinder carries a piston 83 on a stem 85, the latter carrying a resilient brake shoe 87 extending from the hollow portion of the nose 79. This brake shoe 87 may be retracted into the nose 79 but is normally biased by means of a compression spring 89 towards engagement with the inside of the reel 55. An air inlet at 91 (Fig. 3) serves to bring air in under the piston 83 so that the latter may be retracted against the force of the spring 89. This withdraws the shoe 87 from the side of the reel 55. An air hose 93 connects the inlet 91 with the fitting 45. The fitting 45 also carries an air hose 95 which is connected at its lower end to an inlet fitting 97 carried on a slide valve 99 (see Fig. 5). The valve 99 has an internal passage 101 which is plugged by means of a fitting 103. The fitting 103 carries a depending hand control wire 105 for manual operation of the valve in addition to automatic operation to be described.

The slide valve 99 is slidably mounted in a valve body 107 (Figs. 3 and 5). Threaded into the side of the body 107 is an air inlet fitting 109 which is supplied by hose 110 with compressed air from any suitable source. This fitting 109 includes a nose 111 which extends into a groove 113 in the valve 99. The nose is hollow and carries a packing 115 which is biased by spring 117 to engage the bottom of the groove 113 for sealing purposes. The valve 99 carries a port 119 which when the valve is down serves to communicate air under pressure to the hose 95. When the valve is up this communication is broken and the port 119 then moves out from the body 107 to become a relief port while communication is cut off with hose 110. The biasing action of spring 117 on the packing 115 serves to maintain the valve 99 in any position into which it is forced, either up or down.

The valve 99, in addition to being pulled down by the wire 105, is also operable from a rocker bar 121 pivoted to the post 19 at 123. This bar is pinned to the valve 99 at 125. One end of the rocker bar 121 is engageable by one adjustable cam 127 and the other end by another adjustable cam 129 which are carried on opposite edges of the sector gear 44 (Figs. 2 and 3). The cam 127 (Fig. 7) comprises an angle member 131 slotted at 133 and adjustably held to the sector gear 44 by means of locking bolts 135. Thus the position of the cam may be adjusted. A resilient connection is formed between cam 127 and the end of the rocker bar 121 by a cup 137 threaded to a bent-over portion of the plate 131 and carrying an outwardly biased plunger 139. Spring 141 supplies the outward bias. The plunger 139 is the item that directly engages the rocker 121. Referring to the other cam 129, it comprises a plate 143 slotted at 145 and adjustably supported upon the sector gear 44 by means of bolts 147.

The hose 69 passes through an opening 149 in the platen 25 (Fig. 3). The opening is surrounded by roller guide means 151. The end of the hose may carry any suitable valve construction for controlling the fluids therein. For example there is shown in this case a nozzle 153 served from the hose 69 through a hand control valve 155 and flow meter 157.

Operation is as follows, assuming that a predetermined length of the hose has been withdrawn from the reel and that the parts are in the position shown in Fig. 3:

Withdrawal of the hose has caused the pinion 51 to drive the sector gear 44 to a limiting position wherein the cam 127 has contacted the rocker 121 so as to force the valve 99 down. The port 119 receives air from the air supply hose 110 (Fig. 5). Air then flows from the inlet 109, through the valve 99 to the hose 95 from whence it is distributed to the fitting 45 (Fig. 3) supplying pneumatic cylinder 31 and the air brake mechanism 75. The force of the air on the piston 83 retracts the brake shoe 87 from the reel 55 against the action of the spring 89. Since the air is not throttled in its passage to the brake mechanism, the brake releasing action is instantaneous. The supply of air to the cylinder 31 however is throttled through the small passage 47. This gently forces the piston 33 upward in the cylinder 31, thus retracting the piston rod 35 and turning the sector gear 44 clockwise (as viewed in Figs. 2 and 3).

This rotates the reel counterclockwise, drawing in the hose through the opening 149. The action continues until the cam 129 strikes the end of the rocker 121, thus lifting the valve 99 and cutting off port 119 from the air inlet 109. The port travels up until it is clear of the body 107 after which it functions as a release for air from under the brake piston 83. The spring 89 then promptly applies the brake 87 to the reel 55 and stops further indrawing of the hose. At the same time air is cut off from the restricted inlet 47 of the cylinder 31.

The restricted character of this inlet is of some importance since the reel and the hose wound on it have substantial inertia. Thus when the air supply is cut off, not only is the brake 87 promptly applied to stop further rotation of the reel but a very short advance of the piston 33 in the cylinder 31 will result in a quick reduction in pressure under the piston 33 since the throttled inlet throttles further entry of any air from the hose 95. The throttling inlet 47 also has the effect of providing an easy start of winding of the hose so that it is not jerked out of the hands of the operator. Another advantage of this restriction is that the final decelerating action of the reel is prompt so that as the cam 129 strikes the bar 121 the action will not proceed so as violently to force the valve 99 against the central portion 48 of the sector gear 44, which portion 48 forms the upper limiting stop for the valve 99. Another advantage of the restrictive supply of air to the air cylinder is that when air is initially applied for re-winding, it promptly releases the brake before the retrieving action gets into operation, thereby preventing any re-winding against brake action.

The predetermined length of the hose 69 which is to be withdrawn in order to initiate re-winding is determined by the setting of the cam 127. Generally speaking, the length of hose that is unwound in order to bring into play the re-winding operation is adjusted to be the total length of the hose, although this is not absolutely necessary. It may be some shorter length for reaching a predetermined location.

The function of the resilient plunger 139 on cam 127 is to set up an initial resistance to unwinding of the hose susceptible of tactile sensation before the valve is reset so that the operator knows that retrieving is about to occur and before it is actually instigated. Thus the operator has a warning. If the operator desires to have the hose rewound before the predetermined length is pulled out, this may be accomplished by pulling upon the wire control 105 which resets the valve 99 to admit air for retrieving.

From the above it will be seen that after re-winding has been completed a predetermined amount, the flow of air is cut off by contact of the cam 129 with the other end of the rocker bar 121 so as to raise the valve. The cam 129 is adjusted so that when re-winding is completed such an amount of the hose extends from the opening 149 as may be desired for reaching it upon the next operation.

Advantages of the invention are that the reel may be mounted overhead in a location that takes up no ground space and from whence it is quite easy to withdraw the hose. Side pull on the hose on the rollers 151 around the outlet 149 applies force only to the cantilever post 19, any movement of which does not affect the cover parts 11 and 15. Thus shaking and rattling of the light, decorative covers is avoided. In other words, the post constitutes a cantilever construction for taking side thrust and some shake without delivering it to the cover. The cover parts 11 and 15 are structurally attached to the base 7 but are not structurally attached to the platen 25.

Another advantage of the invention is that even with heavy hose loaded with heavy grease under high pressure and with heavy equipment at the end of the hose such as the parts 153, 155, and 157 (Fig. 2), there will not be substantial over-run of the mechanism after a re-winding operation has been completed. Thus undue whipping of the hose as it comes to a stop is avoided. Furthermore the hose always attains a predetermined wound position where it is available for further operation.

An advantage of having the hose returnable automatically after a predetermined amount has been pulled out is that the apparatus may be set up and adjusted for a particular lubricating routine in connection with (for example) an automobile in a predetermined location on a hoist.

All operations may be planned so that when the last operation at maximum distance is performed, a slight tug on the hose for contacting the cam 127 with the bar 121 results in re-winding. Thus an operator may employ a routine of a minimum number of operations for high-speed lubrication. At the same time if a given routine is broken, the hose may be returned at any time by pulling on the control 105.

The construction is also advantageous in that the cantilever post 19 with its operating parts is detachable from the base parts 1, 7 and 9. Also, the cover 11, 15 which has no direct structural connection with the cantilever and operating parts, has a detachable connection with said base parts. This makes easy the installation of the reel, particularly on a ceiling or the like.

Figure 8:
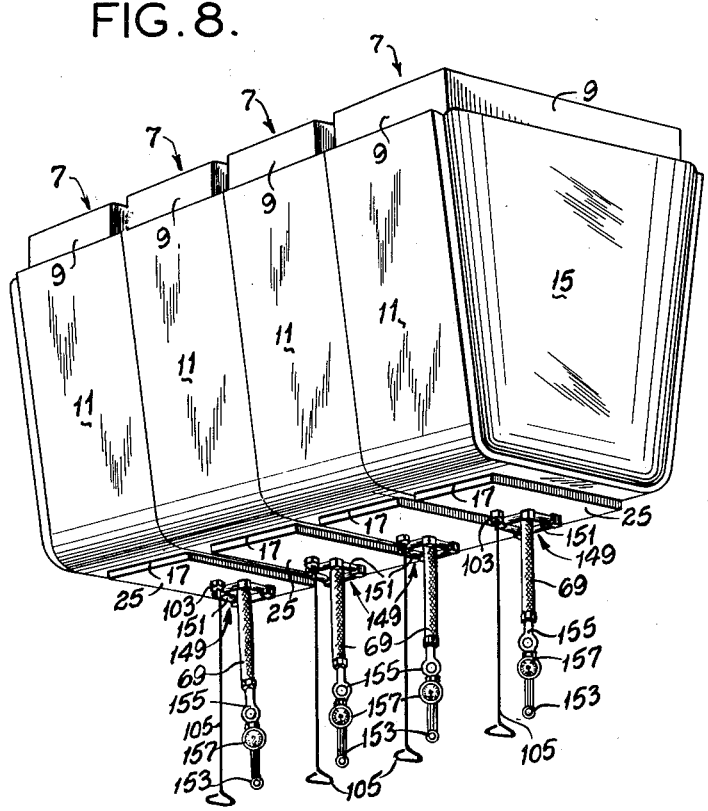
Fig. 8 is a view similar to Fig. 1 showing a number of units of the invention mounted as a battery.

Additional advantages accrue from the invention when individual units such as shown in Fig. 1 are gang mounted, in tandem or as a battery, such as shown in Fig. 8. As indicated in this figure, only two end cover members 15 are used. The remaining cover members 11 abut one another and it is to be understood that it is not necessary to bolt members 11 together, since each is fastened to its respective base 7. Thus whenever it is desired to enter a particular reel for adjustments, repairs or the like, it is necessary only to unbolt the respective member 11 from its base 7 and slide it down to expose the respective parts. All of the covers need not be removed. In the case of the end units, each end member 15 is of course also removed along with its respective member 11 to which it is fastened.

The separate removability of the skirts 9 is also an advantage, since it allows access to the base portions wherein the piping for the system is ordinarily carried. Incidentally, it may be noted that the main supply pipes for a group of the units may be conveniently carried under the channels 1 which are in alignment, suitable openings being supplied in the adjacent covering portions of the skirts 9. In the drawings this auxiliary piping is not shown, because the manner in which it is applied is obvious and variable.

Cross reference under rule 78 (a) is made to the assignee's design patent Des. 155,003, issued August 30, 1949, on application filed August 22, 1947, covering the design shown in Fig. 1, and to the assignee's copending design application entitled Ceiling reel housing, Serial No. D. 141,002, filed August 22, 1947, on the design shown in Fig. 8.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. Reeling apparatus comprising a reel for reeling a supply line, pneumatic operating means therefor, an operating linkage between the pneumatic operating means and the reel, an air brake for the reel adapted not to be released until supplied with air, an air line supplying air to the pneumatic operating means and the air brake, a valve in said air line, means responsive to withdrawal of the supply line adapted to open said valve for delivery of air to the pneumatic operating means and the brake to force said pneumatic operating means to move the reel to wind the supply line while the brake is released.

2. Reeling apparatus comprising a reel for reeling a supply line, pneumatic operating means therefor, a normally set air brake for the reel adapted not to be released until supplied with air, an air line supplying air to the pneumatic operating means and the air brake, a valve in said air line, means responsive to movement of the pneumatic operating means upon withdrawal of the supply line adapted to set the valve to deliver air to the pneumatic operating means and the brake to force said pneumatic operating means to move the reel to retrieve the supply line while the brake is released, and a second means responsive to movement of the pneumatic operating means to reset the valve to release air from the brake and the pneumatic operating means when the supply line is retrieved whereby rewinding ceases and the brake is reset.

3. Reeling apparatus comprising a reel for retrieving a supply line, pneumatic means for operating the reel, a normally set air brake for the reel adapted not to be released until supplied with air, an air line supplying air to the pneumatic means and the air brake, a valve in said air line, means responsive to withdrawal of said supply line automatically to set said valve to deliver air to the pneumatic means and the brake to force said pneumatic means to move the reel to retrieve the supply line while the brake is released, and a second means responsive to retrieving movement of the pneumatic means to reset the valve to release air from the brake and pneumatic means, and means for restricting the flow of air to and from the pneumatic means relative to the air flow to and from the brake.

4. A reel construction comprising a base, a cantilever post extending from said base where the post is exclusively supported, a reeling mechanism supported exclusively upon the post, a platen attached near the unsupported end of said post and having an opening through which a flexible conduit is adapted to be wound and unwound to and from said reeling mechanism, and an enclosing cover attached exclusively to said base and reaching to said platen where said cover has an opening accommodating the platen, the opening and the platen being entirely separated by means of a substantial clearance sufficient to prevent transmission of such vibrations from the post through the platen to the enclosing cover as may be caused by lateral pull caused by winding and unwinding of the flexible conduit and by operation of the reeling mechanism.

ALEXANDER P. FOX.

REFERENCES CITED

The following references are of record in the file of this patent:

UNITED STATES PATENTS

| Number | Name | Date |
|---|---|---|
| 1,489,664 | Dowrelio | Apr. 8, 1924 |
| 2,164,596 | Simonds | July 4, 1939 |
| 2,279,156 | Barks et al. | Apr. 7, 1942 |
| 2,368,293 | Garancher | Jan. 30, 1945 |